United States Patent
Soma et al.

(10) Patent No.: US 10,890,928 B2
(45) Date of Patent: Jan. 12, 2021

(54) FLYING VEHICLE NAVIGATION SYSTEM AND FLYING VEHICLE NAVIGATION METHOD

(71) Applicant: MITSUBISHI HEAVY INDUSTRIES, LTD., Tokyo (JP)

(72) Inventors: Fumihito Soma, Tokyo (JP); Tomoyuki Mori, Tokyo (JP); Koryo Yasui, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 229 days.

(21) Appl. No.: 16/073,152

(22) PCT Filed: May 30, 2016

(86) PCT No.: PCT/JP2016/065900
§ 371 (c)(1),
(2) Date: Jul. 26, 2018

(87) PCT Pub. No.: WO2017/145398
PCT Pub. Date: Aug. 31, 2017

(65) Prior Publication Data
US 2019/0027050 A1    Jan. 24, 2019

(30) Foreign Application Priority Data
Feb. 26, 2016  (JP) ................. 2016-035188

(51) Int. Cl.
*B60F 5/02*       (2006.01)
*B64C 37/00*    (2006.01)
(Continued)

(52) U.S. Cl.
CPC .............. *G05D 1/106* (2019.05); *B60F 5/02* (2013.01); *B64C 37/00* (2013.01); *G05D 1/0234* (2013.01);
(Continued)

(58) Field of Classification Search
CPC .......... B64C 37/00; B64D 45/04; B60F 5/02; G05D 1/101; G05D 1/0676; G05D 1/0234;
(Continued)

(56) References Cited

U.S. PATENT DOCUMENTS 8,862,290 B1    10/2014 Ali
2005/0230564 A1  10/2005 Yamane
(Continued)

FOREIGN PATENT DOCUMENTS

EP    1 586 969    10/2005
EP    1 612 632     1/2006
(Continued)

OTHER PUBLICATIONS

International Search Report dated Aug. 2, 2016 in International (PCT) Application No. PCT/JP2016/065900.
(Continued)

*Primary Examiner* — Behrang Badii
*Assistant Examiner* — Hossam M Abd El Latif
(74) *Attorney, Agent, or Firm* — Wenderoth, Lind & Ponack, L.L.P.

(57) ABSTRACT

A flying vehicle navigation system includes a flying vehicle (2) and a control system (4) that controls the flight of the flying vehicle. The flying vehicle is configured to be switchable to autonomous driving when the flying vehicle is located in a first takeoff and landing section (22) set on the ground. After the flying vehicle is switched to autonomous driving, the control system guides the flying vehicle such that the flying vehicle takes off from a first takeoff and landing section, flies in a three-dimensional road as an exclusive track set in the specific region of the air, and lands on a second takeoff and landing section set on the ground. After the flying vehicle is switched to autonomous driving,
(Continued)

operations from takeoff from the first takeoff and landing section to landing on the second takeoff and landing section are automatically carried out under control by the control system.

3 Claims, 7 Drawing Sheets (51) Int. Cl.
*B64C 39/02* (2006.01)
*B64D 45/04* (2006.01)
*G01S 5/00* (2006.01)
*G05D 1/02* (2020.01)
*G05D 1/04* (2006.01)
*G05D 1/10* (2006.01)
*G05D 1/06* (2006.01)
*G08G 5/00* (2006.01)
*G08G 5/02* (2006.01)
*G08G 5/04* (2006.01)

(52) U.S. Cl.
CPC .......... *G05D 1/0676* (2013.01); *G08G 5/006* (2013.01); *G08G 5/0013* (2013.01); *G08G 5/0021* (2013.01); *G08G 5/0052* (2013.01); *G08G 5/0065* (2013.01); *G08G 5/0069* (2013.01); *G08G 5/0091* (2013.01); *G08G 5/02* (2013.01); *G08G 5/025* (2013.01); *G08G 5/045* (2013.01); *B64D 45/04* (2013.01); *G01S 5/0072* (2013.01); *G05D 1/0202* (2013.01); *G05D 1/042* (2013.01); *G08G 5/0008* (2013.01)

(58) Field of Classification Search
CPC ...... G05D 1/042; G05D 1/0202; G08G 5/045; G08G 5/0021; G08G 5/0065; G08G 5/0069; G08G 5/025; G08G 5/0052; G08G 5/0091; G08G 5/006; G08G 5/0013; G08G 5/02; G08G 5/0008; G01S 5/0072

USPC ........................................................ 701/120
See application file for complete search history.

(56) References Cited

U.S. PATENT DOCUMENTS

| 2009/0105891 | A1* | 4/2009 | Jones ...................... B64C 13/18 701/2 |
| 2011/0121140 | A1* | 5/2011 | Yamane ............... G05D 1/0653 244/183 |
| 2012/0158219 | A1 | 6/2012 | Durling et al. |
| 2013/0345905 | A1* | 12/2013 | Parthasarathy ........ G01C 23/00 701/3 |
| 2014/0316617 | A1 | 10/2014 | Ali |
| 2015/0051758 | A1* | 2/2015 | Cho ........................ G01S 19/49 701/16 |
| 2015/0246720 | A1 | 9/2015 | Gandhi et al. |
| 2017/0001724 | A1* | 1/2017 | Yates ..................... B64D 17/80 |
| 2018/0023974 | A1* | 1/2018 | Otani ................... G01C 21/005 701/3 |
| 2018/0312252 | A1* | 11/2018 | Yates ........................ B64C 1/26 |

FOREIGN PATENT DOCUMENTS

| EP | 2 050 671 | 4/2009 |
| JP | 2005-297922 | 10/2005 |
| JP | 2012-131484 | 7/2012 |
| JP | 2014-210575 | 11/2014 |
| JP | 2015-101198 | 6/2015 |
| JP | 2015-164843 | 9/2015 |
| WO | 2015/075538 | 5/2015 |

OTHER PUBLICATIONS

Extended European Search Report dated Jun. 14, 2019 in corresponding European Patent Application No. 16891555.1.
International Preliminary Report on Patentability and Written Opinion of the International Searching Authority dated Sep. 7, 2018 in International (PCT) Application No. PCT/JP2016/065900.

* cited by examiner

FLYING VEHICLE NAVIGATION SYSTEM AND FLYING VEHICLE NAVIGATION METHOD

TECHNICAL FIELD

The present invention relates to a flying vehicle navigation system and a flying vehicle navigation method.

BACKGROUND ART

In recent years, the study and development of advanced technologies in various fields of automobile have become active. One example of the advanced technologies in the field of automobile is an autonomous driving system. The autonomous driving system makes it possible to navigate the automobile without depending on the driving skill of a user and is effective for the improvement of user friendliness. Regarding the autonomous driving system, a demonstration experiment is being carried out, and partial automation of operation (e.g. auto cruising) is already come into practical use.

However, because the automobile runs on the ground, the securing of safety becomes important for full automation by the autonomous driving system. For example, in case of running on the ground, a technical difficulty exists to secure a safety while avoiding an obstacle, since there are various vehicles driven by a humans such as 4-wheel motor vehicles, a motorcycles, and bicycles, and obstacles such as pedestrians who make irregular movements, and there is a case where the sensing is difficult depending on a road situation and a weather condition.

Another example of the advanced technology of automobile is a flying vehicle (a flying car). The term "flying vehicle" in this Description may be a manned machine or an unmanned machine. The flying vehicle has a mechanism for running on a road and a mechanism for flying (in this case, equipment may be shared by both of the mechanism for running on the road and the mechanism for flying). Such a flying vehicle is sometimes called "a flying car" or "a flight car". For example, the flying vehicle is disclosed in US 2015/0246720A1.

However, there is a legal regulation that it is generally necessary to acquire a license for the operation of a manned flight object. Also, advanced operation skills are required to a manipulator in an area, where there are many obstacles, such as an urban area. Therefore, the flying vehicle has a problem in the user friendliness.

Note that as the technique related to the present invention, JP 2014-210575A discloses an automatic flight system having a function of an automatic flight and an automatic landing.

CITATION LIST

[Patent Literature 1] US 2015/0246720A1
[Patent Literature 2] JP 2014-210575A

SUMMARY OF THE INVENTION

Therefore, one of the objects of the present invention is to provide a user friendly transportation system having a high degree of safety. Other objects of the present invention and new features will be understood by a skilled person from the following disclosure.

In an aspect of the present invention, a flying vehicle navigation system includes a flying vehicle; and a control system configured to control a flight of the flying vehicle. The flying vehicle is configured to be possible to change to autonomous driving when the flying vehicle is positioned in a first takeoff and landing section set on the ground. Note that the phrase of "set on the ground" includes a phrase "set on a structure installed on the ground (more strictly, a structure fixed on the ground)". After the flying vehicle is switched to the autonomous driving, the control system guides or controls the flying vehicle such that the flying vehicle takes off from the first takeoff and landing section, flies in a three-dimensional road that is an exclusive track set in a specific region of the air, and lands on a second takeoff and landing section sec on the ground. After the flying vehicle is switched to the autonomous driving, operations from the takeoff from the first takeoff and landing section to the landing on the second takeoff and landing section are automatically carried out under the control by the control system.

In a desired embodiment, the flying vehicle is configured to receive position measurement data from an artificial satellite, specify a three-dimensional position of the flying vehicle based on the position measurement data, and transmit position data showing the three-dimension position to the control system. The control system guides the flying vehicle based on the position data in the flight of the flying vehicle in the three-dimensional road.

Also, when the flying vehicle is configured to receive position measurement data from the artificial satellite, specify a three-dimensional position of the flying vehicle based on the position measurement data, and transmit position data showing the three-dimension position to the control system, it is desirable that the flying vehicle transmits destination data showing a destination to the control system when the destination is set to the flying vehicle. In this case, it is desirable that the control system selects the three-dimensional road where the flying vehicle flies, based on the position data of the flying vehicle and the destination data.

At this time, the control system selects the first takeoff and landing section from which the flying vehicle takes off, from among a plurality of takeoff and landing sections set on the ground, based on the position data of the flying vehicle and the destination data, and transmits to the flying vehicle a flight plan that contains the selected first takeoff and landing section and the selected three-dimensional road, and the flying vehicle displays the flight plan on a display device. It is desirable that the first takeoff and landing section from which the flying vehicle takes off is displayed on a display screen of the display device where the flight plan is displayed.

In another aspect of the present invention, a flying vehicle navigation method is provided that navigates a flying vehicle by a flying vehicle navigation system that includes a control system. The flying vehicle navigation method includes: switching the flying vehicle to an autonomous driving when the flying vehicle is positioned on a first takeoff and landing section set on the ground; and after the flying vehicle is switched to the autonomous driving, guiding the flying vehicle such that the flying vehicle takes off from the first takeoff and landing section, flies in a three-dimensional road as an exclusive track set in a specific region of the air, and lands on a second takeoff and landing section set on the ground. After the flying vehicle is switched to the autonomous driving, operations of the flying vehicle from the takeoff from the first takeoff and landing section to the landing on the second takeoff and landing section are automatically carried out under the control by the control system.

According to the present invention, the user-friendly transportation system having a high safety is provided.

DESCRIPTION OF THE EMBODIMENTS

Hereinafter, the embodiments of a flying vehicle navigation system of the present invention will be described with reference to the attached drawings.

Figure 1:
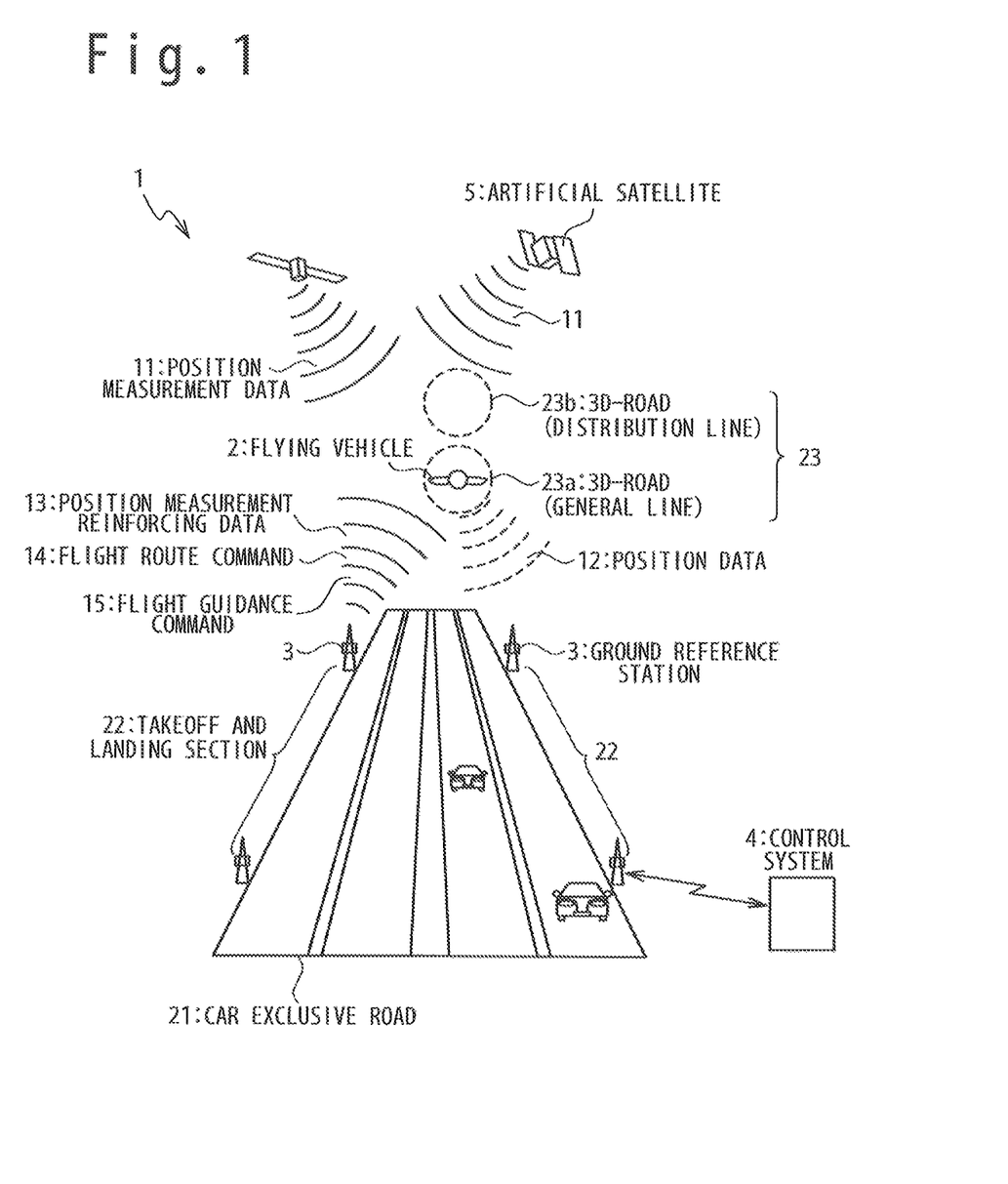
FIG. 1 is a conceptual diagram showing a configuration of a flying vehicle navigation system according to an embodiment of the present invention.

FIG. 1 is a conceptual diagram showing a configuration of a flying vehicle navigation system 1 according to an embodiment of the present invention. The flying vehicle navigation system 1 in the present embodiment is a system to navigate a flying vehicle 2 and has a ground reference station 3 installed on the ground and a control system 4.

The flying vehicle 2 may be a manned machine or an unmanned machine and has a mechanism for running on a road and a mechanism for flying. Note that the mechanism for running on the road and the mechanism for flying may not be fully separated and may have equipment shared by both of these mechanisms. The flying vehicle 2 receives data and commands for navigation of the flying vehicle 2 from the control system 4 through the ground reference station 3. Also, the flying vehicle 2 transmits data necessary for the control system 4 to control the flying vehicle 2, to the control system 4 through the ground reference station 3.

For the control of the flying vehicle 2, it is desirable to specify a three-dimensional position of the flying vehicle 2 precisely. In the present embodiment, in order to specify the three-dimensional position of the flying vehicle 2, the flying vehicle 2 receives position measurement data 11 from a plurality of artificial satellites 5. In this case, the flying vehicle 2 uses the GNSS (Global Navigation Satellite System) technique to specify its three-dimensional position by using the position measurement data. For example, as artificial satellites 5, the GPS (global positioning system) satellites and quasi zenith satellites can be used. The flying vehicle 2 transmits position data 12 showing its own three-dimensional position to the control system 4 through the ground reference station 3.

The ground reference station 3 carries out the communication necessary for navigation of the flying vehicles 2 with the flying vehicle 2. In addition, in the present embodiment, the ground reference station 3 transmits position measurement reinforcing data 13 to the flying vehicle 2. The flying vehicle 2 carries out a calculation operation to improve the precision of its own three-dimensional position by using the received position measurement reinforcing data 13. For the purpose of improvement of the precision of the three-dimensional position of the flying vehicle 2, a VRS (virtual reference station)—GPS technique and a pseudolite technique may be used.

The control system 4 is a hardware device (a computer system) to control navigation of the flying vehicle 2. The control system 4 controls the flying vehicle 2 based on the position data 12 received from the flying vehicle 2. More specifically, for example, the control system 4 transmits a flight route command 14 and a flight guidance command 15 to the flying vehicle 2 through the ground reference station 3. In this case, the flight route command 14 is a command of instructing a flight route of the flying vehicle 2, and the flight guidance command 15 is a command of instructing of a flight speed of the flying vehicle 2.

The outline of navigation of the flying vehicle 2 in the flying vehicle navigation system 1 of the present embodiment is as follows. The flying vehicle 2 takes off from and lands onto takeoff and landing sections 22 set on the ground. Note that the phrase "set on the ground" includes a case of being set on a structure (a work fixed on the ground more strictly) such as a road, a building, and a construction. For example, the takeoff and landing section 22 may be set to be a car exclusive road 21. Also, the takeoff and landing section 22 may be set on a building and a construction constructed on the ground (e.g. a factory, a building, a traffic facility and so on). FIG. 1 shows only one takeoff and landing section 22 but it should be understood that there are a plurality of takeoff and landing sections 22 in an actual situation. Also, note that in this Description, "the takeoff and landing section" does not imply that the takeoff and landing section is used for both of the takeoff and the landing but implies that it is used for one of the takeoff and landing. A driving person of the flying vehicle 2 moves the flying vehicle 2 to the takeoff and landing section 22 by the operation by himself or the autonomous driving. After the flying vehicle 2 reaches the takeoff and landing section 22, the flying vehicle 2 is switched to the autonomous driving in case of being not in the autonomous driving. Then, the flying vehicle 2 takes off from the takeoff and landing section 22 under the control by the control system 4.

After taking off, the flying vehicle 2 flies to the takeoff and landing section 22 that is located near a destination, by an automatic guided flight under the control by the control system 4. The flight route of the flying vehicle 2 after the takeoff is limited to a three-dimensional road 23. In this case, the three-dimensional road 23 is an exclusive track that is set in a specific region of the air and through which the flying vehicle 2 is permitted to fly. In one embodiment, the three-dimensional road 23 is set in the air above the car exclusive road 21. Note that the setting place of three-dimensional road 23 is not limited to the air above the car exclusive road 21, but may be in the air above a building, a construction and so on, and in the air above the sea, and in a tunnel. The three-dimensional road 23 may be used based on an application. The general line that is a generally usable three-dimensional road 23 is shown by 23a in FIG. 1, and a logistic line that is a three-dimensional road 23 used for the transport of goods (i.e. logistics) is shown by 23b. The flight route of the flying vehicle 2, i.e. the three-dimensional road 23 through which the flying vehicle 2 flies is automatically selected by the control system 4 based on the destination of the flying vehicle 2. The selection of three-dimensional road 23 is optimized based on a traffic situation, a weather situation and measuring equipment data acquired by a measuring equipment of the flying vehicle 2. The control system 4 transmits the flight route command 14 and the flight guidance command 15 to the flying vehicle 2 through the ground reference station 3 so that the flying vehicle 2 flies in a desired speed in the desired three-dimensional road 23.

After the flight to the takeoff and landing section 22 near the destination by the automatic guided flight, the flying vehicle 2 lands on the takeoff and landing section 22 automatically. After the flying vehicle 2 lands, the flying vehicle 2 is operated from the takeoff and landing section 22 to the destination by the driving person himself or the autonomous driving.

The navigation of the flying vehicle 2 in such a procedure is favorable in both of the safety and the user friendliness. In the flying vehicle navigation system 1 of the present embodiment, the regions for takeoff, flight and landing of the flying vehicle 2 are restricted to the specific regions (the takeoff and landing sections 22 and the three-dimensional road 23). Thus, by restricting entry of another vehicle (e.g. a vehicle driven by a person) or a flight object (e.g. an UAV (unmanned aero vehicle) like a drone) to the takeoff and landing sections 22 and the three-dimensional road 23, the safety can be improved. On the other hand, in the flying vehicle navigation system 1 of the present embodiment, because the flying vehicle 2 flies automatically under the control by the control system 4, the driving person is not required to acquire an operation license and an operation technique so that the user friendliness can be improved.

Below, the configuration and operation of the flying vehicle navigation system 1 will be described in detail.

Figure 2:
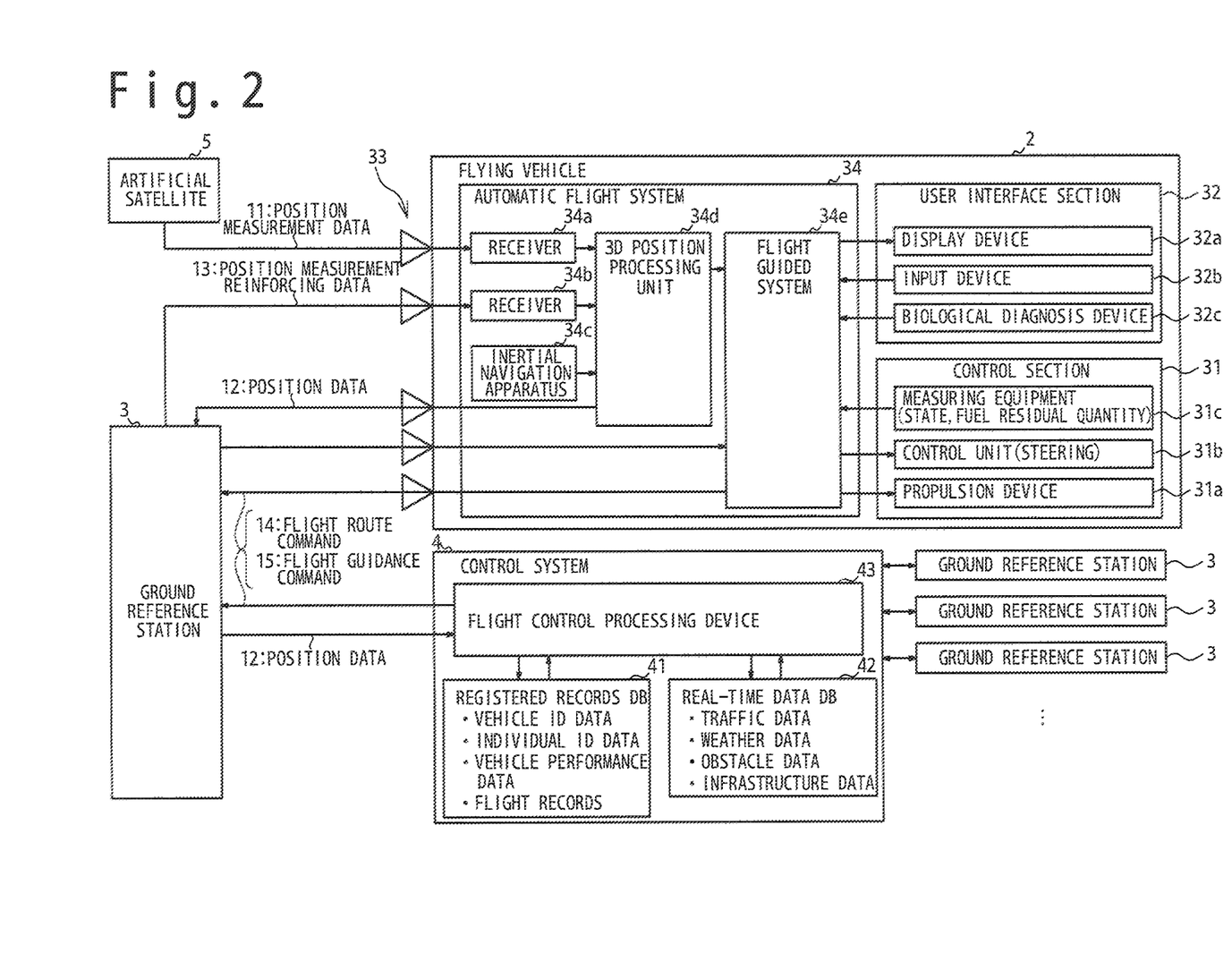
FIG. 2 is a block diagram showing the configuration of the flying vehicle navigation system in this embodiment.

FIG. 2 is a block diagram showing the configuration of the flying vehicle navigation system 1, especially, an example of the configuration of each of devices contained in the flying vehicle navigation system 1. The flying vehicle 2 has a control section 31, a user interface section 32, an antenna device 33 and an automatic flight system 34.

The control section 31 has a propulsion device 31a, a control unit 31b and a measuring equipment 31c. The propulsion device 31a generates the propulsion of the flying vehicle 2, and the control unit 31b controls the flight direction of the flying vehicle 2 (carries out the steering). The measuring equipment 31c measures the states of various equipments (for example, the propulsion device 31a and the control unit 31b) that are contained in the flying vehicle 2 and a residual quantity of fuel that remains in a tank. As described later, data acquired by the measuring equipment 31c are sent to an automatic flight system 34 and the control system 4 and used for the control of the flying vehicle 2.

The user interface section 32 works as a man-machine interface to the driving person of the flying vehicle 2. The user interface section 32 has a display device 32a, an input device 32b and a biological diagnosis device 32c. The display device 32a displays various types of data for the driving person of the flying vehicle 2. The data displayed on the display device 32a are generated by the automatic flight system 34. The input device 32b is operated by the driving person to receive an input from the driving person. The biological diagnosis device 32c acquires physiological data of the driving person of the flying vehicle 2 to carry out the diagnosis of the health state of the driving person and acquires biological data to carry out biometric authentication. The results of the diagnosis and the biometric authentication by the biological diagnosis device 32c are transmitted to the automatic flight system 34, and moreover, transmitted to the control system 4 through the ground reference station 3.

The antenna device 33 is used for the communication with the ground reference station 3 and the reception of the position measurement data 11 from the artificial satellites 5.

The automatic flight system 34 has receivers 34a and 34b, and an inertial navigation apparatus 34c, a three-dimensional position processing unit 34d and a flight guided system 34e. The receiver 34a receives the position measurement data 11 from the artificial satellites 5 and the receiver 34b receives the position measurement reinforcing data 13 from the ground reference station 3. The inertial navigation apparatus 34c calculates its own position and speed by an inertia measuring device loaded on the inertial navigation apparatus 34c. The three-dimensional position processing unit 34d specifies the three-dimensional position of the flying vehicle 2 from the position measurement data 11 received from the artificial satellites 5, the position measurement reinforcing data 13 received from the ground reference station 3, and output data from the inertial navigation apparatus 34c, and generates the position data 12 showing the current three-dimensional position of the flying vehicle 2. The generated position data 12 is transmitted to the control system 4 through the ground reference station 3. The flight guided system 34e carries out various types of calculation and control to realize the automatic flight of the flying vehicle 2. For example, the flight guided system 34e controls the propulsion device 31a and the control unit 31b in response to the position data 12 of the flying vehicle 2 acquired by the three-dimensional position processing unit 34d, and a flight route command 14 and a flight guidance command 15 sent from the control system 4 so that the flying vehicle 2 flies on a desired flight route.

The control system 4 has a registered records database 41, a real-time data database 42 and a flight control processing device 43.

The flying vehicle 2 whose flight has been permitted is registered on the registered records database 41. In the registered records database 41, regarding each of the flying vehicles 2 whose flights have been permitted, vehicle identification data used to identify the flying vehicle 2 (vehicle ID), individual identification data showing the driving person of the flying vehicle 2, vehicle performance data showing performance of the flying vehicle 2, and the flight records of the flying vehicle 2 (past flight records of the flying vehicle 2) may be registered.

In the real-time data database 42, various types of data showing the situation of a control region of the control system 4 (a region where the control system 4 controls the flying vehicle 2) are accumulated. In the real-time data database 42, for example, traffic data showing a traffic situation in the control region, weather data showing the weather of the control region, obstacle data as data of an obstacle in the control region, and infrastructure data as data of buildings in the control region may be accumulated. Data accumulated in the real-time data database 42 (for example, the traffic data, the weather data, the obstacle data and the infrastructure data) may be acquired from a system outside the flying vehicle navigation system 1 in an appropriate time interval.

The flight control processing device 43 carries out various operations to control the flying vehicle 2. For the control of the flying vehicle 2, for example, the position data 12, the measuring equipment data 17, and the biological diagnosis data 18, all of which are transmitted from the flying vehicle 2, and the data accumulated in the registered records database 41 and the real-time data database 42 are used.

Figure 3A:
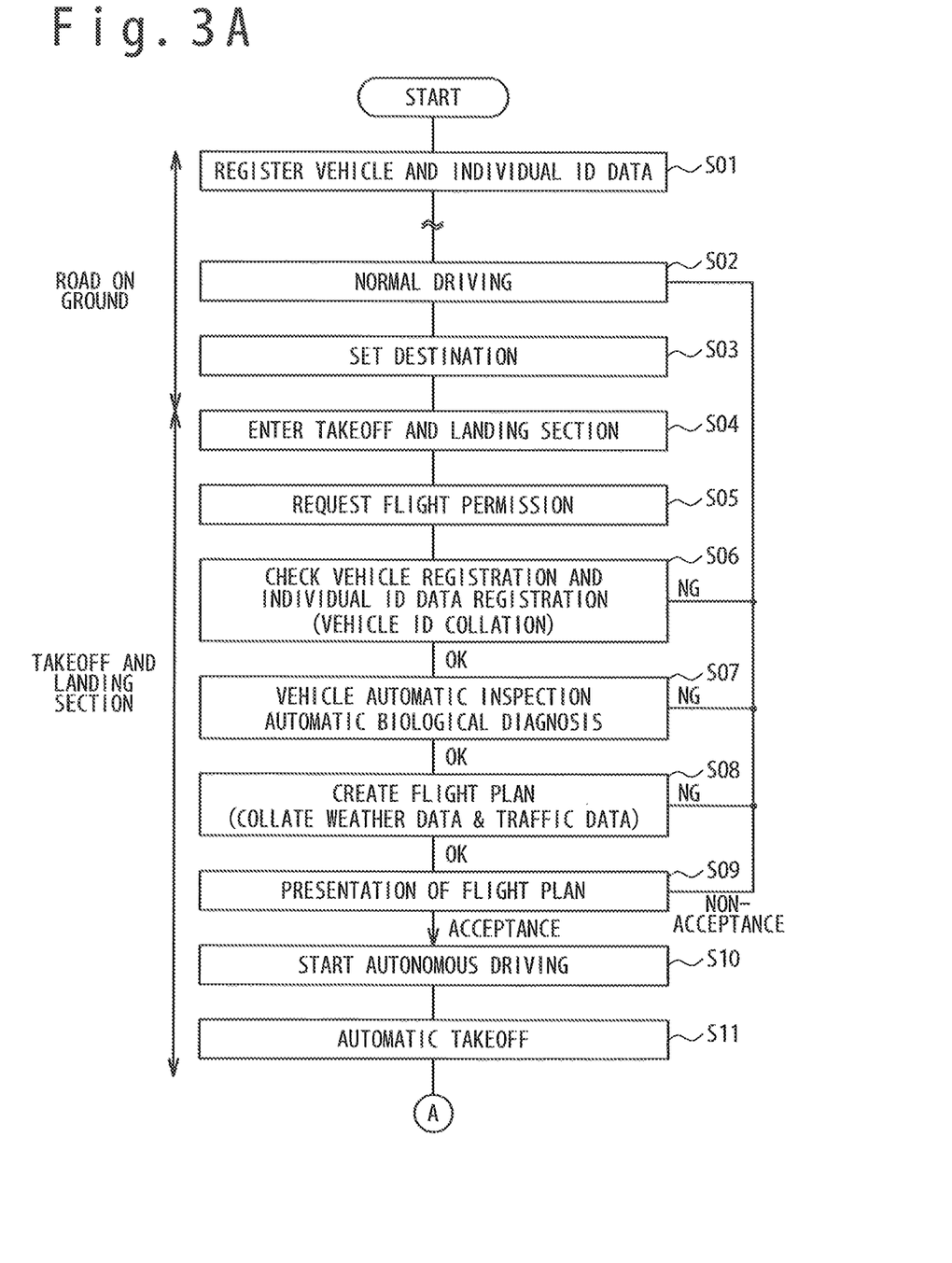
FIG. 3A is a flow chart showing an example of a procedure of navigation of a flying vehicle in this embodiment.
Figure 3B:
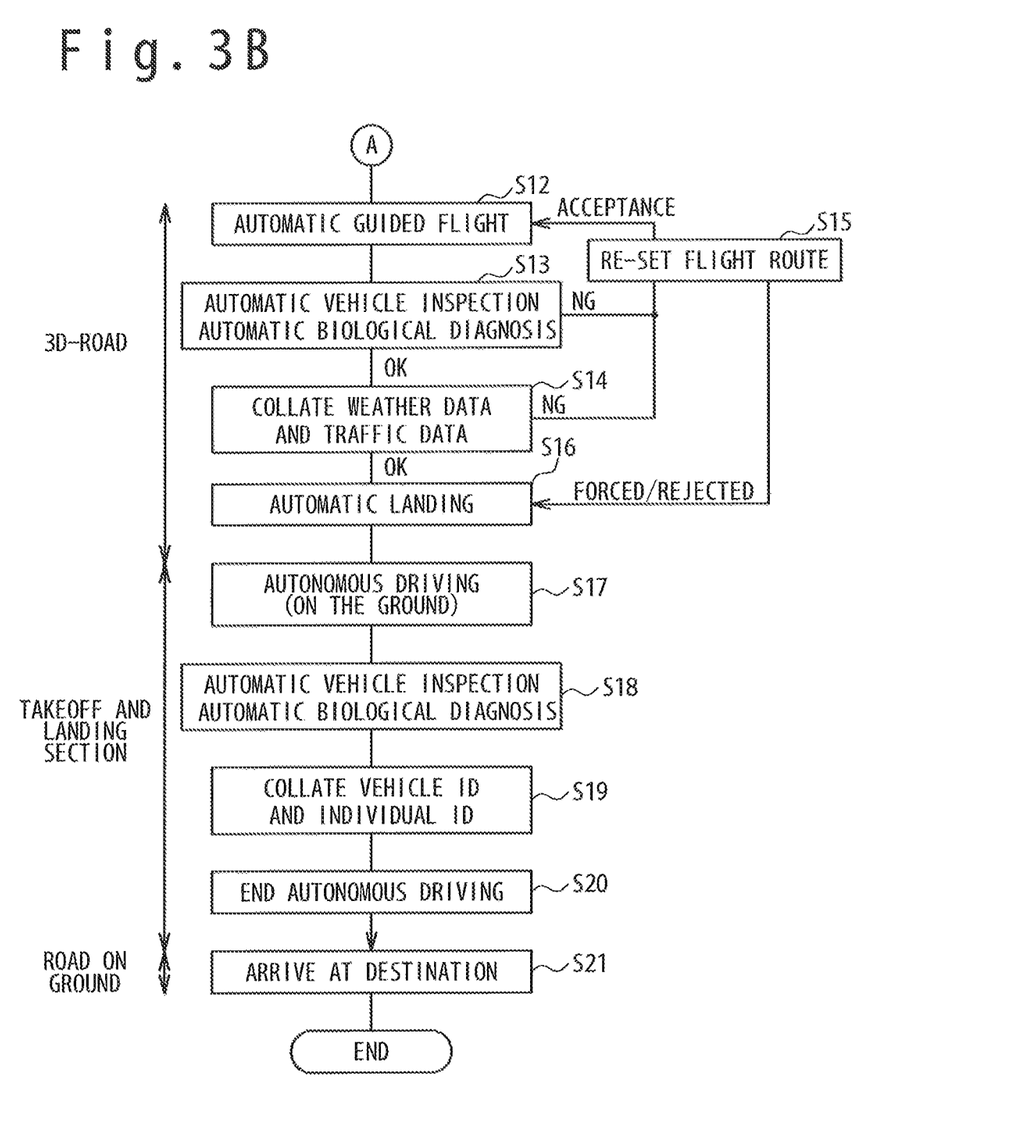
FIG. 3B is a flow chart showing the example of the procedure of navigation of the flying vehicle in this embodiment.

Next, the navigation of the flying vehicle 2 in the flying vehicle navigation system 1 of the present embodiment will be described. FIG. 3A and FIG. 3B are flow charts showing an example of procedure of the navigation of the flying vehicle 2 in the present embodiment.

As shown in FIG. 3A, in the flying vehicle navigation system 1 of the present embodiment, it is requested to register the identification data of the flying vehicle 2 and the driving person previously (Step S01). At the step S01, for example, the vehicle identification data of the flying vehicle 2, the individual identification data showing the driving person of the flying vehicle 2, and the vehicle performance data showing the performance of the flying vehicle 2 are registered on the registered records database 41.

In the flying vehicle navigation system 1 of the present embodiment, because the takeoff of the flying vehicle 2 is permitted only in the takeoff and landing section 22, the flying vehicle 2 is moved to the takeoff and landing section 22 by operation by the driving person himself or the autonomous driving (Step S02). The flying vehicle 2 runs on a road on the ground until arriving at the takeoff and landing section 224. For example, the flying vehicle 2 may run on a general road where a general automobile can run until reaching the takeoff and landing section 22. Moreover, the driving person inputs the destination to the input device 32*b* of the user interface section 32 of the flying vehicle 2 to set the destination (Step S03).

When the flying vehicle 2 enters the takeoff and landing section 22 (Step S04), the driving person who requests a flight, of the flying vehicle 2 carries out a predetermined operation to the input device 32*b* to issue a flight permission request (Step S05). The flight permission request is transmitted to the control system 4 through the ground reference station 3.

Figure 4:
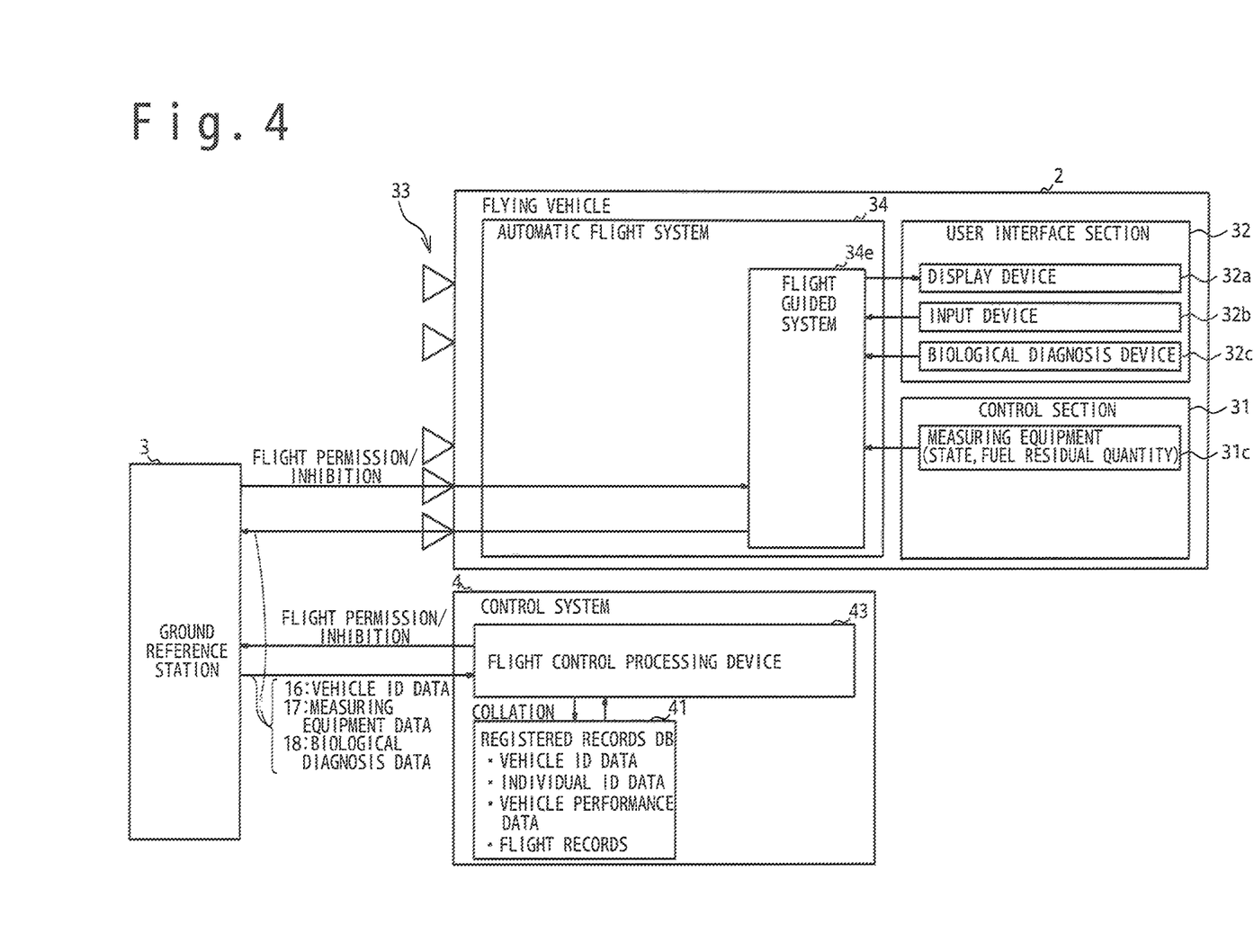
FIG. 4 is a conceptual diagram showing data communication between the flying vehicle and a control system in determination of whether flight of the flying vehicle should be permitted.

When the flight permission request is sent to the control system 4, the determination of whether or not the flight of the flying vehicle 2 should be permitted is carried out (Steps S06-S08) FIG. 4 is a conceptual diagram showing the communication between the flying vehicle 2 and the control system 4 in the determination of whether or not the flight of the flying vehicle 2 should be permitted.

First, whether or not the flying vehicle 2 requesting the permission of the flight has been registered is checked (Step S06). In the present embodiment, the vehicle identification data 16 for identifying the flying vehicle 2 is transmitted to the control system 4 from the flying vehicle 2 through the ground reference station 3. Thus, the vehicle identification data 16 transmitted to the control system 4 and the vehicle identification data registered on the registered records database 41 are collated. Thus, whether or not the flying vehicle 2 has been registered is determined.

A check of the driving person of the flying vehicle 2 may be carried out at the same time as the check of the registration of the flying vehicle 2. In this case, the individual identification data is previously registered on the registered records database 41. In the check of the driving person, the individual identification data of the driving person of the flying vehicle 2 is transmitted to the control system 4 from the flying vehicle 2 through the ground reference station 3. Thus, the individual identification data transmitted to the control system 4 and the individual identification data registered on the registered records database 41 are collated. As the individual identification data, the biological data for biometric authentication may be used. In this case, the biological data of the driving person are registered on the registered records database 41 as the individual identification data. In the check of the driving person, the biological data of the driving person are acquired by the biological diagnosis device 32*c*, and the biological data of the driving person of the flying vehicle 2 are transmitted to the control system 4 from the flying vehicle 2 through the ground reference station 3. The biometric authentication is carried out by using the biological data transmitted to the control system 4 and the biological data registered on the registered records database 41. Thus, the check of the driving person of the flying vehicle 2 is carried out. However, when the flying vehicle 2 is an unmanned aerial vehicle with no driving person, the check of the driving person is unnecessary.

When the flying vehicle 2 is not registered, the flight of the flying vehicle 2 is not permitted. The flying vehicle 2 is kept in the state in which the flying vehicle 2 is on the ground (Step S06: NG). Also, when the check of the driving person of the flying vehicle 2 is carried out, the flight of the flying vehicle 2 is not permitted even in case where the driving person is not registered. When the flight of the flying vehicle 2 is not permitted, non-permission of the flight is notified to the flying vehicle 2 and displayed on the display device 32*a* of the flying vehicle 2.

In addition, the automatic check of the flying vehicle 2 and the automatic biological diagnosis of the driving person are carried out (Step S07). These are carried out to determine whether the state of the flying vehicle 2 and the state of the driving person of the flying vehicle 2 can be endured for flight. In the embodiment, the state of each equipment of the flying vehicle 2 (e.g. the propulsion device 31*a* and the control unit 31*b*) and the residual quantity of fuel tank are measured by the measuring equipment 31*c* of the flying vehicle 2 so as to generate the measuring equipment data 17. The measuring equipment data 17 are sent to the control system 4 through the ground reference station 3, and the flight control processing device 43 of the control system 4 carries out the automatic check of the flying vehicle 2 based on the measuring equipment data 17. The automatic flight system 34 of the flying vehicle 2 may carry out the automatic check of the flying vehicle 2 based on the measuring equipment data 17 acquired by the measuring equipment 31*c*, and the result of the automatic check may be notified to the control system 4. In addition, the physiological data of the driving person of the flying vehicle 2 are acquired by the biological diagnosis device 32*c* of the flying vehicle 2, and moreover, the diagnosis of the health state of the driving person is carried out based on the physiological data. The biological diagnosis data 18 showing this diagnosis result are transmitted to the control system 4 through the ground reference station 3.

When the state of the flying vehicle 2 and the state of the driving person of the flying vehicle 2 are determined to not be able to stand the flight from the measuring equipment data 17 and the biological diagnosis data 18, the flight of the flying vehicle 2 is not permitted. The flying vehicle 2 is kept in the state of operation by the driving person (Steps S06 and S07: NG). When the flight of the flying vehicle 2 is not permitted, the non-permission of flight is notified to the flying vehicle 2 and is displayed on the display device 32*a* of the flying vehicle 2.

When the state of the flying vehicle 2 and the state of the driving person of the flying vehicle 2 are determined to be in the state that can stand the flight, a flight plan 20*a* is created according to the destination set to the flying vehicle 2 by the flight control processing device 43 of the control system 4 (Step S08). For example, the flight plan may contain a plan of a flight route of the flying vehicle 2 and a scheduled passage time at each position on the flight route. The flight plan is shown to the driving person of the flying vehicle 2 on the display device 32a of the flying vehicle 2 (Step S09).

Figure 5:
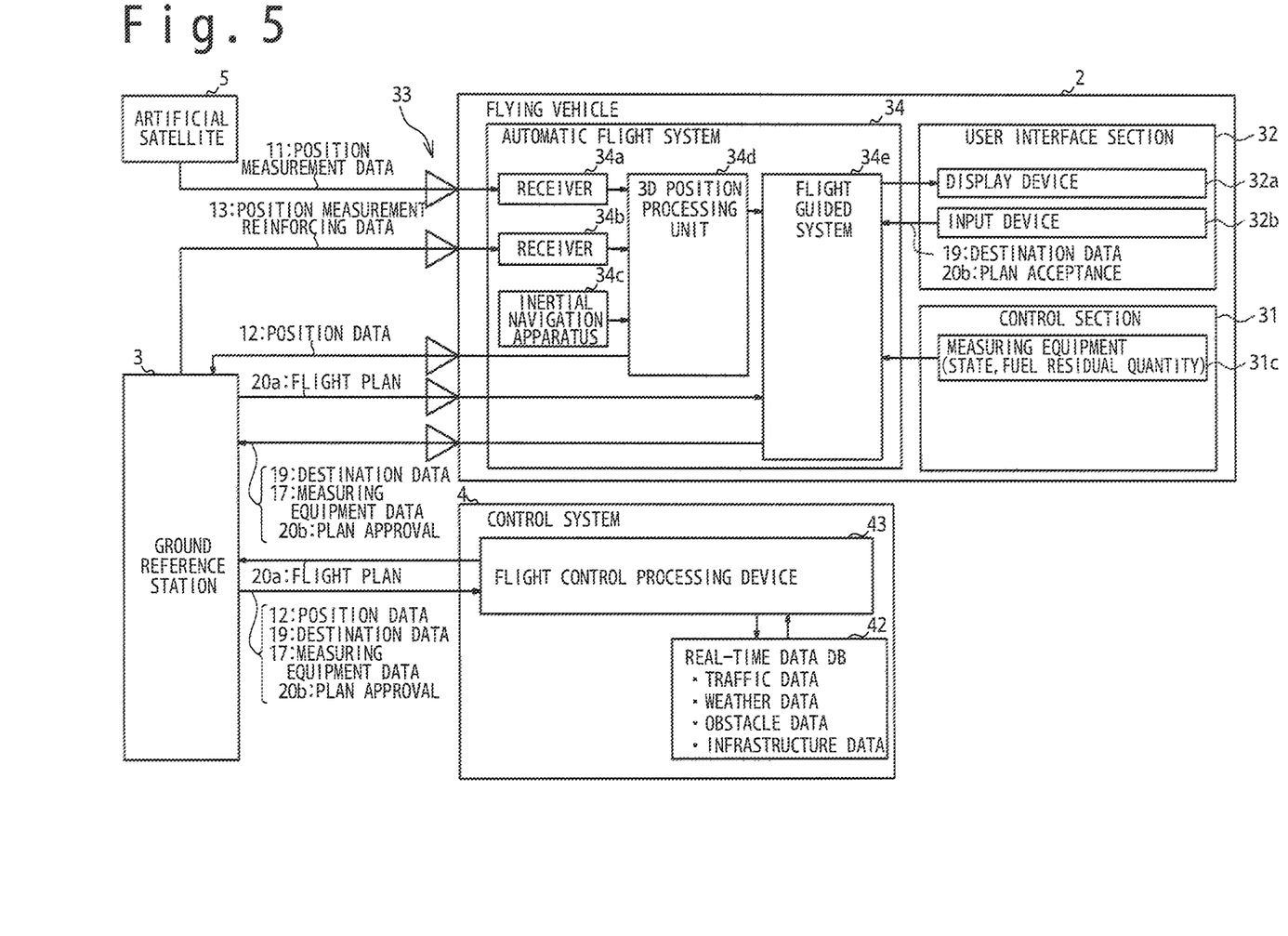
FIG. 5 is a conceptual diagram showing the data communication between the flying vehicle and the control system in creation of a flight plan and presentation of it to a driving person.

FIG. 5 is a conceptual diagram showing the data communication between the flying vehicle 2 and the control system 4 in case of the creation and presentation of the flight plan to the driving person. In the creation of the flight plan (shown by 20a in FIG. 5), the position data 12 of the flying vehicle 2 and destination data 19 are transmitted to the control system 4. As described above, the position data 12 of the flying vehicle 2 shows a current three-dimensional position of the flying vehicle 2 specified from the position measurement data 11 received from the artificial satellites 5, the position measurement reinforcing data 13 received from the ground reference station 3, and the output data of the inertial navigation apparatus 34c. The flight control processing device 43 of the control system 4 creates the flight plan 20a from the destination data 19 and the position data 12. In detail, the takeoff and landing section 22 on which the flying vehicle 2 should land is selected based on the destination data 19, and moreover, a route to the takeoff and landing section 22, the three-dimensional road 23 through which should be passed to reach the takeoff and landing section 22 is selected.

In the creation of the flight plan 20a, the data accumulated in the real-time data database 42, such as the traffic data, the weather data, the obstacle data, and the infrastructure data are referred to. In the embodiment, the takeoff and landing section 22 for landing and the three-dimensional road 23 through the flying vehicle 2 passes until reaching the takeoff and landing section 22 for landing are selected based on the traffic data, the weather data, the obstacle data and the infrastructure data accumulated in the real-time data database 42. For example, one of the takeoff and landing sections 22 that are not in a crowed state may be selected as the takeoff and landing section 22 for landing based on the traffic data. Also, one of the takeoff and landing sections 22 other than the takeoff and landing section 22 where the weather is bad may be selected as the takeoff and landing section 22 for landing based on the weather data. Also, one of the takeoff and landing sections 22 other than the takeoff and landing section 22 where there is an obstacle may be selected as the takeoff and landing section 22 for landing based on the obstacle data. Moreover, based on the infrastructure data showing the states of artificial satellite 5, the ground reference station 3, and the takeoff and landing sections 22, the three-dimensional road 23 where the good infrastructure is secured may be selected as the route to the takeoff and landing section 22 for landing.

Also, in case of creation of the flight plan 20a, the measuring equipment data 17 may be referred to from the flying vehicle 2. For example, the fuel residual quantity that is shown in the measuring equipment data 17 may be considered in case of the creation of the flight plan 20a.

Here, when it is determined that an appropriate flight plan 20a cannot be created from the data accumulated in the real-time data database 42 (e.g. the traffic data, the weather data, the obstacle data, and the infrastructure data) and the measuring equipment data 17, the flight of the flying vehicle 2 is not permitted. When the flight of the flying vehicle 2 is not permitted (Step S08: NG), non-permission of the flight is notified to the flying vehicle 2 and is displayed on the display device 32a of the flying vehicle 2. In this case, the flying vehicle 2 is maintained in the state on the ground.

When the flight plan 20a is created, the created flight plan 20a is transmitted to the flying vehicle 2 through the ground reference station 3. The flight plan 20a is displayed on the display device 32a of the flying vehicle 2. A prompt is displayed on the display device 32a to select one of approval and non-approval of the flight plan 20a, The driving person operates the input device 32b to select the approval or the non-approval of the flight plan 20a. When the driving person accepts the flight plan 20a, a plan approval 20b is generated and transmitted to the control system 4 through the ground reference station 3 from the flying vehicle 2. A plurality of flight plans 20a may be created. In such a case, the driving person may accept one desired flight plan of the plurality of flight plans 20a.

As shown in FIG. 3A, when the flight plan 20a is accepted (that is, when the plan approval 20b is transmitted to the control system 4), the autonomous driving of the flying vehicle 2 is started (Step S10). The flying vehicle 2 runs on the takeoff and landing section 22 by the autonomous driving under the control by the control system 4.

After the autonomous driving of the flying vehicle 2 is started, the flying vehicle 2 automatically takes off from a desired point of the takeoff and landing section 22 under the control by the control system 4 (Step S11). After the takeoff from the takeoff and landing section 22, the control system 4 guides the flying vehicle 2 to the three-dimensional road 23, and as shown in FIG. 3B, the automatic guided flight of the flying vehicle 2 through the three-dimensional road 23 is started (Step S12).

Figure 6:
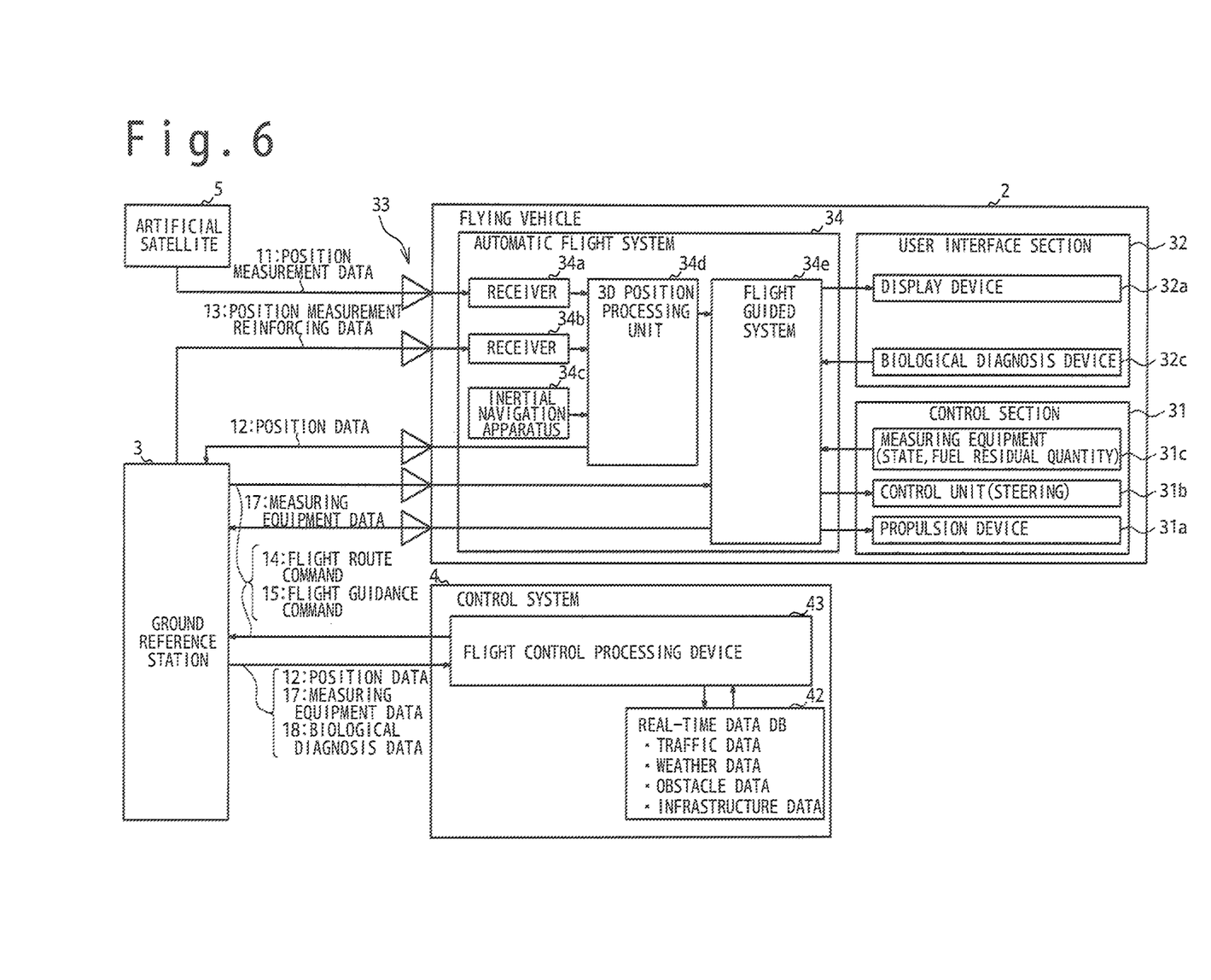
FIG. 6 is a conceptual diagram showing the data communication between the flying vehicle and the control system in the time of flight of the flying vehicle.

FIG. 6 is a conceptual diagram showing data communication between the flying vehicle 2 and the control system 4 during the flight of the flying vehicle 2.

While the flying vehicle 2 flies, the position data 12 of the flying vehicle 2 is sequentially transmitted to the control system 4 through the ground reference station 3. As described above, the position data 12 of the flying vehicle 2 are data specified from the position measurement data 11 received from artificial satellites 5, the position measurement reinforcing data 13 received from the ground reference station 3, and the output data of the inertial navigation apparatus 34c to show the current three-dimensional position of the flying vehicle 2.

The control system 4 guides and controls the flying vehicle 2 based on the position data 12 received from the flying vehicle 2 so that the flying vehicle 2 flies on the three-dimensional road 23 of the route shown by the accepted flight plan 20a. The guidance of the flying vehicle 2 is carried out by transmitting the flight route command 14 and the flight guidance command 15 to the flying vehicle 2. As described above, the flight route command 14 is a command to instruct the flight route to the flying vehicle 2, and the flight guidance command 15 is a command to instruct the flight speed of the flying vehicle 2. The flight guided system 34e of the flying vehicle 2 controls the propulsion device 31a and the control unit 31b of the flying vehicle 2 in response to the position data 12 of the flying vehicle 2, and the flight route command 14 and the flight guidance command 15 that are sent from the control system 4 for the flying vehicle 2 to fly on the desired route.

While the flying vehicle 2 flies, the automatic inspection of the flying vehicle 2 and the automatic biological diagnosis of the driving person may be carried out Step S13). In the embodiment, the state of each of the equipments of the flying vehicle 2 (e.g. the propulsion device 31a, and the control unit 31b) and the fuel residual quantity of the tank are measured by the measuring equipment 31c of the flying vehicle 2 so as to generate the measuring equipment data 17.

The measuring equipment data 17 is sent to the control system 4 through the ground reference station 3. The flight control processing device 43 of the control system 4 carries out the automatic inspection of the flying vehicle 2 based on the measuring equipment data 17. The automatic flight system 34 of the flying vehicle 2 may carry out the automatic inspection of the flying vehicle 2 based on the measuring equipment data 17 acquired by the measuring equipment 31c and notify the result of the automatic inspection to the control system 4. In addition, the physiological data of the driving person of the flying vehicle 2 is acquired by the biological diagnosis device 32c of the flying vehicle 2, and moreover, the diagnosis of the health state of the driving person is carried out based on the physiological data. The biological diagnosis data 18 showing this diagnosis result is transmitted to the control system 4 through the ground reference station 3.

When it is determined that it is necessary to change of the flight route as a results of the automatic inspection of the flying vehicle 2 and the automatic biological diagnosis of the driving person, the re-setting of the flight route is carried out (Step S15). For example, when it is determined that the flying vehicle 2 cannot stand the flight shown by the flight plan 20a as a result of the automatic inspection of the flying vehicle 2, the re-setting of the flight route is carried out by the flight control processing device 43 of the control system 4. Also, the re-setting of the flight route is carried out when it is determined that the driving person cannot stand the flight shown by the flight plan 20a as the result of the automatic biological diagnosis of the driving person.

Also, while the flying vehicle 2 flies, the weather situation and traffic situation of three-dimensional road 23 in the flight route may be checked (Step S14). Specifically, the weather data and the traffic data showing the weather situation and the traffic situation in the three-dimensional road 23 of the flight route, from among the weather data and the traffic data accumulated by the real-time data database 42 are referred by the flight control processing device 43 of the control system 4. The flight route is determined to be necessary to change the flight route, when the flight route shown by the flight plan 20a is not appropriate from the viewpoint of the weather situation and the traffic situation based on the weather data and traffic data, and the resetting of the flight route is carried out (Step S15).

When it is determined not to be necessary to change the flight route, the automatic guided flight of the flying vehicle 2 is continuously carried out until reaching the takeoff and landing section 22 for landing.

When the flight route is determined to be changed as the results of the automatic inspection of the flying vehicle 2, the automatic biological diagnosis of the driving person, and the inquiry of the weather data, the traffic data, the obstacle data and the infrastructure data, the re-setting of the flight route is carried out (Step S15). The re-setting of the flight route is carried out based on the position data 12, the weather data, the traffic data, the obstacle data and the infrastructure data, that are latest.

When the re-setting of the flight route is carried out, a new flight plan 20a that contains a re-set flight route is displayed on the display device 32a of the flying vehicle 2. A prompt to select approval or non-approval of the flight plan 20a is displayed on the display device 32a. The driving person operates the input device 32b to select the approval or non-approval of the new flight plan 20a. When the driving person accepts the new flight plan 20a, the automatic guided flight is carried out according to the new flight plan 20a after that.

In this case, when required from the viewpoint of safety, for example, when the flying vehicle 2 and/or the driving person are determined to be not able to stand the flight, the re-setting of the flight route is carried out to compulsorily land on a nearby takeoff and landing section 22. When the new flight plan 20a is not accepted, the re-setting of the flight route is carried out for the flying vehicle 2 to land on the nearby takeoff and landing section 22.

When reaching the takeoff and landing section 22 for landing, the automatic landing of the flying vehicle 2 is carried out (Step S16). Moreover, the flying vehicle 2 shifts to an autonomous driving mode in the takeoff and landing section 22 (Step S17).

After that, to grasp an influence of the flight on the flying vehicle 2 and the driving person, the automatic inspection of the flying vehicle 2 and the automatic biological diagnosis of the driving person are carried out (Step S18). In the embodiment, the state of each of equipments of the flying vehicle (e.g. the propulsion device 31a and the control unit 31b) and the fuel residual quantity of the tank are measured by the measuring equipment 31c of the flying vehicle 2, and measuring equipment data 17 showing the measurement result are transmitted to the control system 4 through the ground reference station 3. The flight control processing device 43 of the control system 4 carries out the automatic inspection of the flying vehicle 2 based on the measuring equipment data 17. In addition, the physiological data of the driving person of the flying vehicle 2 are acquired by the biological diagnosis device 32c of the flying vehicle 2, and the diagnosis of the health state of the driving person is carried out based on the physiological data. The biological diagnosis data 18 showing this diagnosis result are transmitted to the control system 4 through the ground reference station 3.

Also, the identifications of the flying vehicle 2 and the driving person are carried out according to necessity from the reason of charging to the flight in the three-dimensional road 23 (Step S19). The vehicle identification data 16 to identify the flying vehicle 2 are transmitted to the control system 4 from the flying vehicle 2 through the ground reference station 3, and the vehicle identification data 16 transmitted to the control system 4 are collated with the vehicle identification data registered on the registered records database 41. Also, the individual identification data of the driving person of the flying vehicle 2 are transmitted to the control system 4 through the ground reference station 3 from the flying vehicle 2, and the individual identification data transmitted to the control system 4 are collated with the individual identification data registered on the registered records database 41.

After that, the autonomous driving of the flying vehicle 2 in the takeoff and landing section 22 for landing is ended (Step S20). After the autonomous driving in the takeoff and landing section 22 for landing is ended, the flying vehicle 2 is moved to the destination by the operation of the driving person himself or the autonomous driving in a road on the ground (Step S21).

The above-described navigation of the flying vehicle 2 is favorable in both viewpoints of the safety and the user-friendliness. In the present embodiment, the taking off and landing and the flight of the flying vehicle 2 are restricted to a specific region (the takeoff and landing sections 22 and the three-dimensional road 23). Therefore, by restricting the entry of another vehicle and a flight body into the takeoff and landing sections 22 and the three-dimensional road 23, the safety can be improved. On the other hand, in the flying vehicle navigation system 1 of the present embodiment, because the flying vehicle 2 flies automatically under the control by the control system 4, the user friendliness can be improved.

In the navigation procedure of the flying vehicle 2 shown in FIG. 3A and FIG. 3B, the takeoff and landing section 22 from which the flying vehicle 2 takes off is selected by the driving person. However, a flight plan that contains the takeoff and landing section 22 from which the flying vehicle 2 takes off may be created by the control system 4. In the embodiment, when the driving person sets the destination to the flying vehicle 2 in the state that the flying vehicle 2 is on the ground, the position data 12 showing the current position of the flying vehicle 2, and the destination data 19 showing the destination are transmitted to the control system 4 from the flying vehicle 2.

When receiving the position data 12 and the destination data 19, the control system 4 creates the flight plan 20*a*. The flight plan 20*a* contains the takeoff and landing section 22 from which the flying vehicle 2 takes off. In detail, the takeoff and landing section 22 from which the flying vehicle takes off and the takeoff and landing section 22 on which the flying vehicle lands are selected based on position data 12 and destination data 19. Moreover, a route between the takeoff and landing section 22 from which the flying vehicle takes off and the takeoff and landing section 22 on which the flying vehicle lands, that is, the three-dimensional road 23 through which the flying vehicle passes in the flight from the takeoff and landing section 22 for takeoff to the takeoff and landing section 22 for landing is selected.

In the creation of the flight plan 20*a*, the data accumulated in the real-time data database 42, e.g. the traffic data, the weather data, the obstacle data, and the infrastructure data are referred to. In the embodiment, the takeoff and landing section 22 for landing and the three-dimensional road 23 through which the flying vehicle passes until reaching the takeoff and landing section 22 for landing are selected based on the traffic data, the weather data, the obstacle data and the infrastructure data that are accumulated in the real-time data database 42. For example, the takeoff and landing sections 22 that are not crowed may be selected as the takeoff and landing sections 22 for takeoff and landing based on the traffic data. Also, the takeoff and landing sections 22 except for the takeoff and landing section 22 where the weather is bad may be selected as the takeoff and landing sections 22 for takeoff and landing based on the weather data. Also, the three-dimensional road 23 that is not crowded may be selected as a route between the takeoff and landing sections 22 for takeoff and landing based on the traffic data, and one of the three-dimensional roads 23 except for the three-dimensional road 23 in the bad weather may be selected as a route between the takeoff and landing sections 22 for takeoff and landing based on the weather data. Also, the three-dimensional road 23 where there is not any obstacle may be selected as the route between the takeoff and landing section 22 for takeoff and the takeoff and landing section 22 for landing based on the obstacle data. Also, the three-dimensional road 23 where a safe infrastructure is secured may be selected as the route to the takeoff and landing section 22 for landing based on the infrastructure data showing the states of the artificial satellites 5, the ground reference station 3, and the takeoff and landing sections 22.

Also, in the creation of the flight plan 20*a*, the measuring equipment data 17 may be referred to from the flying vehicle 2. For example, the fuel residual quantity shown in the measuring equipment data 17 may be taken into account in case of the creation of the flight plan 20*a*.

The flight plan 20*a* created in this way is displayed on the display device 32*a* of the flying vehicle 2 to show to the driving person of the flying vehicle 2. The takeoff and landing section 22 from which the flying vehicle 2 takes off is shown in the flight plan 20*a* displayed on the display screen of the display device 32*a* The driving person of the flying vehicle 2 can know the takeoff and landing section 22 for takeoff from the display screen. After arriving at the takeoff and landing section 22 for takeoff, a flight permission request is issued through a predetermined operation of the input device 32*b* of the flying vehicle 2. A procedure similar to the navigation procedure shown in FIG. 3A and FIG. 3B except for the creation (step S08) of the flight plan 20*a* is carried out, and the automatic takeoff, the automatic guided flight and the automatic landing of the flying vehicle 2 are carried out.

The embodiments of the present invention have been specifically described in the above. However, the present invention must not be interpreted as being limited to the above-mentioned embodiments. It is explicitly obvious to a skilled person that the present invention may be implemented together with various modifications.

EXPLANATION OF REFERENCE NUMERALS OR SYMBOLS

1: flying vehicle navigation system
2: flying vehicle
3: ground reference station
4: control system
5: artificial satellite
11: position measurement data
12: position data
13: position measurement reinforcing data
14: flight route command
15: flight guidance command
16: vehicle identification data
17: measuring equipment data
18: biological diagnosis data
19: destination data
20*a*: flight plan
20*b*: plan approval
21: car exclusive road
22: takeoff and landing section
23: three-dimensional road
31: control section
31*a*: propulsion device
31*b*: control unit
31*c*: measuring equipment
32: user interface section
32*a*: display device
32*b*: input device
32*c*: biological diagnosis device
33: antenna device
34: automatic flight system
34*a*: receiver
34*b*: receiver
34*c*: inertial navigation apparatus
34*d*: three-dimensional position processing unit
34*e*: flight guided system
41: registered records database
42: real-time data database
43: flight control processing device

The invention claimed is:
1. A flying car navigation system comprising:
a flying car; and a control system configured to control a flight of the flying car,
wherein the flying car is configured to:
  determine a three-dimensional position of the flying car;
  transmit position data showing the three-dimension position of the flying car to the control system; and
  transmit destination data showing a destination of the flying car to the control system when the destination is set to the flying car,
wherein the control system is configured to:
  select a takeoff section from among a plurality of takeoff and landing sections based on the position data of the flying car and the destination data, the plurality of takeoff and landing sections comprising a takeoff and landing section that includes a part of a car exclusive road fixed on the ground;
  select a three-dimensional road that is an exclusive track set in a specific region of the air based on the position data of the flying car and the destination data; and
  transmit to the flying car a flight plan that contains the selected takeoff section and the selected three-dimensional road,
wherein the flying car is configured to begin the flight by automatic operation when the flying car is positioned in the takeoff section,
wherein the control system is configured to, in the flight of the flying car, guide the flying car such that the flying car takes off from the takeoff section, flies in the three-dimensional road, and lands on a landing section,
wherein operations of the flying car from the takeoff from the takeoff section to the landing on the landing section are automatically carried out under a control by the control system,
wherein the flying car is configured to display the flight plan on a display device, and
wherein the takeoff section is displayed on a display screen of the display device on which the flight plan is displayed.

2. A flying car navigation method that navigates a flying car, the method comprising:
  determining a three-dimensional position of the flying car;
  transmitting position data showing the three-dimension position of the flying car to a control system;
  transmitting destination data showing a destination of the flying car from the flying car to the control system in response to the destination being set to the flying car,
  selecting, by the control system, a takeoff section from among a plurality of takeoff and landing sections based on the position data of the flying car and the destination data, the plurality of takeoff and landing sections comprising a takeoff and landing section that includes a part of a car exclusive road fixed on the ground;
  selecting a three-dimensional road that is an exclusive track set in a specific region of the air based on the position data of the flying car and the destination data;
  transmitting to the flying car a flight plan that contains the selected takeoff section and the selected three-dimensional road;
  displaying the flight plan on a display device of the flying car, wherein the takeoff section is displayed on a display screen of the display device on which the flight plan is displayed;
  guiding the flying car such that the flying car takes off from the takeoff section; and
  guiding the flying car such that the flying car flies in the three-dimensional road and lands on a landing section, after the flying car takes off from the takeoff section,
  wherein operations of the flying car from the takeoff from the first takeoff section to the landing on the landing section are automatically carried out under a control by the control system.

3. A control system that controls a flight of a flying car, comprising:
  a flight control processing device configured to:
    receive position data showing a three-dimension position of the flying car;
    receive destination data showing a destination of the flying car from the flying car;
    select a takeoff section from among a plurality of takeoff and landing sections based on the position data of the flying car and the destination data, the plurality of takeoff and landing sections comprising a takeoff and landing section that includes a part of a car exclusive road fixed on the ground;
    select a three-dimensional road that is an exclusive track set in a specific region of the air based on the position data of the flying car and the destination data;
    transmit to the flying car a flight plan that contains the selected takeoff section and the selected three-dimensional road; and
    guide the flying car such that the flying car takes off from the takeoff section, flies in the three-dimensional road, and lands on a landing section,
  wherein operations of the flying car from the takeoff from the first takeoff section to the landing on the landing section are automatically carried out under a control by the control system.

* * * * *